Oct. 22, 1963     T. M. COSTAKOS     3,107,828
VALVE MECHANISM FOR CREAM DISPENSERS
Filed May 1, 1961
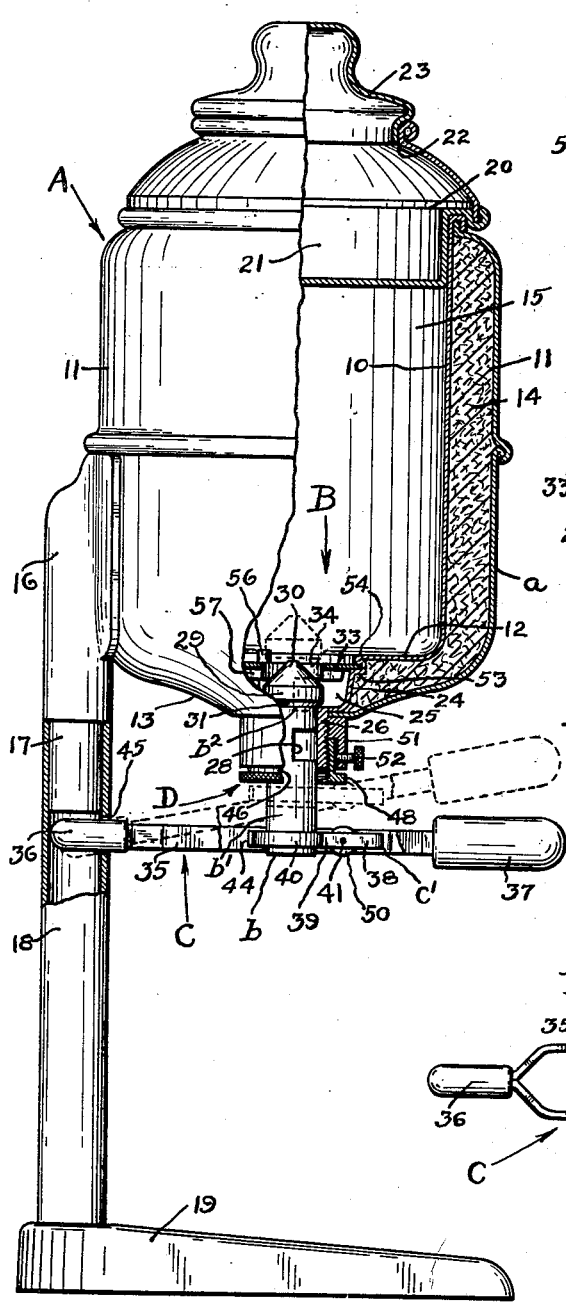
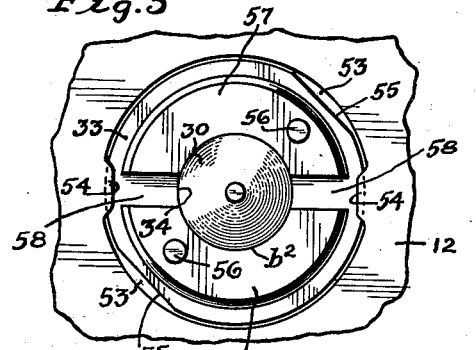
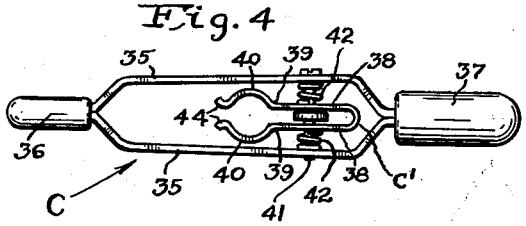
INVENTOR.
Theodore M. Costakos
BY
Baswell, Lagaard + Wicke
Attorneys

United States Patent Office 3,107,828
Patented Oct. 22, 1963

3,107,828
VALVE MECHANISM FOR CREAM DISPENSERS
Theodore M. Costakos, 3851 California Ave.,
Minneapolis, Minn.
Filed May 1, 1961, Ser. No. 106,719
7 Claims. (Cl. 222—438)

My invention relates to cream dispensers of the nature used in cafes and restaurants and at lunch counters in dispensing cream from a supply container into cups, bowls, individual pitchers and other receptacles in desired quantities upon the operation of an actuating lever.

Generally, it is an object of the invention to provide improvements in cream dispensers of the nature aforesaid which have relatively few parts of relatively simple, durable and inexpensive construction which are easily assembled and disassembled and which are readily cleansed for sanitary purposes.

Prior cream dispensers of the present nautre have not had universal utility as is now desirable in the trade. Some prior dispensers have been adapted selectively to deliver various measured quantities of cream in a single cycle of operation of a self-retracting actuating lever upon holding the lever temporarily at the end of its working throw. Such dispensers, however, have not been able also on a single working throw of the actuating lever to deliver cream in quantity in excess of any measured amount and to the extent of draining the entire contents of the supply container.

Neither have such prior dispensers have been adapted accurately to repeat delivery of a dash of cream in a wide range of predetermined relatively small amounts upon advancing the actuating lever to the end of its working throw and thereat releasing said lever instantly.

More specifically, therefore, it is an object of my invention to provide a cream dispenser of the present nature having adjustable parts adapting the dispenser, upon advancing the actuating lever and holding it advanced to deliver, selectively, predetermined measured quantities of cream, and further to deliver cream in greater quantity to the maximum extent of entirely emptying the container of its contents, and also still further adapting the dispenser, when the actuating lever is advanced and allowed to retract instantly, to deliver a dash of cream in selected quantity within a range of available differing quantities.

Other objects of the invention reside in the novel combinatioin and arrangement of parts and in the details of construction hereinafter illustrated and/or described.

In the drawings:

FIG. 1 is a side elevational view of a cream dispenser constructed in accordance with the present invention, portions thereof being broken away to reveal otherwise concealed parts of the valve mechanism and other parts of the dispenser.

FIG. 2 is a vertical sectional view in detail of said valve mechanism.

FIG. 3 is a plan view in detail showing the invertible valve plate of said valve mechanism.

FIG. 4 is a plan view in detail illustrating the actuating lever for the lift valve of said valve mechanism.

The illustrated embodiment of the invention includes a container A having a double walled body $a$ consisting of upright inner and outer cylindrical side walls 10, 11, and bottom walls 12, 13, said side walls and bottom walls being spaced apart and having an insulating material 14 interposed therebetween. Said container body $a$ provides a supply chamber 15 for cream to be dispensed. Attached to the outer wall 11 of the container body $a$ is a bracket 16 formed with a depending stud 17 which is socketed in the upper end of a tubular leg 18 upstanding from a base member 19. Supported by said leg 18, the container A is held in position for placement therebeneath of a cup, bowl, pitcher or other receptacle into which cream is to be delivered from said container. The container body $a$ is open at the top thereof and normally covered by a cap 20 which is removable from the container body $a$ to admit of the introduction of cream into the supply chamber 15 and to provide access thereto. Said cap 20 has a compartment 21 therein and is provided with a filler opening 22 for the introduction of ice into said compartment 21, there being a closure 23 for normally closing said filler opening 22.

The inner bottom wall 12 of the container body $a$ is centraly cupped providing a sump member 24 forming a sump chamber 25 for the cream supply chamber 15 of the container A. Said sump member 24 is an element of a valve mechanism B for receiving cream from the supply chamber 15 and for discharging it into receptacles disposed for its reception.

Included in said valve mechanism B is a tubular valve guide 26 depending from the container body $a$ and communicating at its upper end with the sump chamber 25. The upper portion of the valve guide 26 is received in aligned openings in the sump-forming cupped portion of the inner bottom wall 12 and the outer bottom wall 13 of the container body $a$ and is suitably attached, as by welding, to both of said walls. Associated with the tubular valve guide 26 is a lift valve $b$ having a stem $b^1$ and a head $b^2$. The stem $b^1$ of said lift valve $b$ is cylindrical and slides vertically in the tubular valve guide 26 with the head $b^2$ of said valve disposed within the sump member 24. Said stem $b^1$ has an axial bore 27 therein opening at the bottom of the stem for the discharge of cream therefrom, and it is formed with an ingress port 28 in the side thereof which is closed by the valve guide 26 in the normally depressed non-dispensing position of the lift valve $b$, as seen in solid lines in FIG. 1. This ingress port 28 of the lift valve $b$, in the elevated dispensing positions of said valve, opens in greater or lesser degree into the sump chamber 25 of the container A, as seen in dotted lines in FIG. 1 and in dotted lines and solid lines in FIG. 2. The head $b^2$ of the lift valve $b$ has a cylindrical body portion 29 of greater diameter than that of the stem $b^1$, and it has a conical tip portion 30 and a beveled annular shoulder 31 at its junction with the stem $b^1$. This beveled shoulder 31 of the valve head $b^2$ is engageable with the upper inner edge 32 of the bore $26^a$ of the tubular valve guide 26 and not only provides a low-limit stop for the valve head $b^2$, upon its engagement with said valve guide 26, but also seals off the sump chamber 25 from said bore $26^a$ of the valve guide 26 in which the valve stem slides.

Capping the sump member 24 in the container body $a$ is a valve plate 33 formed with an inlet port 34 which receives and is closed by the body portion 29 of the valve head $b^2$ in all of the elevated dispensing positions of the lift valve $b$, except in its uppermost dispensing position, wherein said body portion 29 of the lift valve $b$ occupies position above and clear of the valve plate 33. In said uppermost dispensing position of said lift valve $b$, the inlet port 34 in the valve plate 33 is unobstructed by the valve head $b^2$, in which situation cream can flow from the supply chamber 15 into the sump chamber 25 and thence through the ingress port 28 of the valve stem $b$ and into and out of the discharge bore 27 of said stem.

The lift valve $b$ is raised into its various elevated cream dispensing positions by means of a vertically swingable actuating lever C, which, with the lift valve $b$, descends by gravity to bring the valve $b$ into its normal non-dispensing position (solid lines, FIG. 1) wherein the shoulder 31 of the valve head $b$ engages the inner upper edge 32 of the tubular guide 26 and the ingress port 28 in the valve stem $b^1$ is closed by the wall of the bore $26^a$ of said valve guide.

The actuating lever C consists of a pair of relatively spaced bars 35, the end portions of which at the tip of the lever, are brought together and lodged in a ferrule 36. At the butt of the lever C, the corresponding end portions of the bars 35 are brought together and lodged in a handle 37, said ferrule 36 and said handle 37 having a common axis which extends midway between the spaced bars 35. Between said bars 36 is a yoke-like coupler $c^1$ made of a length of a band of spring steel or other suitable resilient material which is bent intermediately upon itself to form a pair of relatively spaced shank members 38, each with an arm 39 extending therefrom. These arms 30 are oppositely curved outwardly at their end portions, as at 40, to embrace the cylindrical stem $b^1$ of the lift valve $b$, as will later more fully appear. Said coupler $c^1$ is pivotally mounted on the lever C by means of a pintle 41 which extends through both bars 35 of said lever and both shank members 38 of the coupler $c^1$. A pair of helical expansion springs 42 encircle the pintle 41. One spring 42 is interposed between one of the lever bars 35 and the adjacent shank member 38 of the coupler $c^1$, the other spring 42 being similarly disposed relative to the other lever bar 35 and shank member 38 of said coupler. These expansion springs 42 center the coupler $c^1$ between the lever bars 35 and yieldingly restrain said coupler against pivotal movement about said pintle 41.

Externally of the lower portion of the stem $b^1$ of the lift valve $b$, said stem is formed with an annular groove 43 of the same width as the width of the arms 35 of the coupler $c^1$, the terminal portions of which arms 35 are outwardly turned, as at 44, to form guides to aid in coupling the coupler $c^1$ to the valve stem $b^1$. Operatively assembled in the dispenser structure, the actuating lever C is disposed with its ferrule 36 extending into and fulcrumed on the lower wall portion of an opening 45 in the tubular leg 18, and with the curved arm portions 40 of the coupler $c^1$ embracing the valve stem $b^1$ within the groove 43 therein. To raise the lift valve $b$ the actuating lever C is swung upwardly by its handle 37, the lowering of the valve $b$ being self effected by gravity upon releasing the handle 37 of the upwardly swung lever C. Said lever C is readily removed from the assembly merely by pulling upon the lever lengthwise thereof, such force serving to withdraw the resilient coupler arms 39 from the valve stem $b$ and also to withdraw the ferrule 36 from the opening 45 in the leg 18. To re-apply the lever C, the ferrule 36 is inserted into said opening 45 in the leg 18. At the same time, the arms 39 of the coupler $c^1$ are thrust against the valve stem $b^1$ at the locality of the groove 43 therein, said arms being thereby spread apart sufficiently to enable them by their own resiliency to close about the valve stem $b^1$ embracing it yieldingly within said groove 43.

Location of the lift valve $b$ in any of its various elevated cream dispensing positions is determined by adjustable high-limit stop means D which arrests the ascent of the valve $b$ upon the lifting thereof by the lever C. Said high-limit stop means D includes an annular stop nut 46 applied to threads 47 formed externally on the tubular valve guide 26, this stop nut 46 being screwable up and down along said valve guide 26. Said stop nut 46 has an annular flange 48 at its lower end, said flange 48 providing an annular downwardly facing abutment surface 49 and serving as a finger piece for turning the stop nut 46, the outer edge of said flange 48 being knurled or otherwise roughened to facilitate the grip of the fingers thereon. The rearwardly disposed portion of the annular abutment surface 49 of the stop nut 46 lies in the path of a striker lug 50 on the lever C. This striker lug 50, preferably in the form of a disc, is axially mounted on the pintle 41 of the actuating lever C between the shank members 38 of the coupler $c^1$. So located said striker lug 50 lies in a vertical plane with which the common axis of the ferrule 36 and handle 37 of the lever C and the axis of the valve $b$ coincide. Thus, the striker lug 50 of the actuating lever C meets the abutment surface 49 of the stop nut 46 in said vertical plane without tendency of causing said lever to twist when it is thrust upwardly in stationing the valve $b$ for delivery of cream therefrom.

The threads 47 of the valve guide 26 and the body portion of the stop nut 46 are encased by an annular shroud 51. Said shroud 51 is internally threaded at its upper portion and screwed on said valve guide 26 into locked position bearing at its upper end against the outer bottom wall 13 of the container A. A set screw 52, threaded through said shroud 51, is engagable at its inner end with the stop nut 46 to secure said stop nut in any of its positions of adjustment. Score lines 53 in the body portion of the stop nut 46 constitute lines of demarkation which, when observed with reference to the lower edge of the shroud 51, aid in attaining desired adjustments of the stop nut 46 along the valve guide 26.

As seen in FIGS. 2 and 3, the valve plate 33 is generally circular or disc-like in form and rests marginally thereof on an anular ledge 53 formed in the wall of the sump 24 just beneath the level of the inner bottom wall 12 proper of the container body $a$. Key projections 54 formed in the inner bottom wall 12 of the container body $a$ in diametrically opposed disposition relative to the sump 24, overlie upper marginal portions of the valve plate 33 in its position on the ledge 53 and hold said plate 33 seated on said ledge 53. The edge of the valve plate 33 is formed with diametrically opposite flats 55 which when disposed abreast of said key projections 54 enable the valve plate 33 to be lifted from its supporting ledge 53 and removed from the container A for cleansing purposes, or inverted for reasons soon to appear. Diametrically opposed pins 56 extending through the valve plate 33 provide finger pieces for turning said plate to lock it under and unlock it from its locking key projections 54 overhanging the supporting ledge 53, and for lifting said plate from and returning it to said ledge.

Except for the pins 56, the obverse face of the valve plate 33, shown as the lower face in FIG. 2, is flat overall. This lends to the sump chamber 25 its maximum capacity enabling it to measure charges of cream in relatively generous amount for delivery from the lift valve $b$. To somewhat reduce such capacity of the sump chamber 25, the reverse side of the valve plate 33 is formed with a pair of bosses 57 thereon which, when the valve plate 33 is inverted, as seen in solid lines in FIG. 1, occupies space within the sump chamber 25 and minimizes the measurement of the charge of cream contained in said sump chamber. These bosses 57 are of arcuate form curved about the inlet port 34 of the valve plate 33, there being spaces 58 between said bosses 57 providing radial ways along the reverse face of said valve plate 33 for the passage of cream from the supply chamber 15 into the inlet port 34 of said valve plate.

In operation, the actuating lever C is swung upwardly the full extent allowed by the stop nut 46 and is so held for a greater or lesser interval of time, or instantly released according to the end desired. When a measured amount of cream equal to the maximum capacity of the sump chamber 25 is to be delivered, the valve plate 33 and the stop nut 46 will be positioned as shown in solid lines in FIG. 2, and the lever C will be held against said stop nut 46 momentarily to enable the entire contents of the filled sump chamber 25 to flow from said chamber through the port 28 in the valve stem $b^1$ and into and out of the discharge bore 27 of said stem. This procedure is followed under circumstances calling for successively available charges of cream in relatively generous accurately measured amount in each charge.

To dispense successive charges of cream in less generous measured amount than above indicated, the valve plate 33 will be inverted taking the position shown in FIG. 1 with the bosses 57 disposed within the sump chamber 25. In this situation, the lever C upon each actuation thereof will be held momentarily against the stop nut 46 to allow the then full measured charge of cream in the sump chamber 25 to flow therefrom via the ingress port 28 and discharge bore 27 in the lift valve $b$.

To quickly dispense merely a dash of cream in relatively very small amount upon each actuation of the lever C, the stop nut 46 will be positioned on the valve guide 26 somewhere in a range of positions between upper and lower limits indicated by the solid lines and the dotted lines, respectively in FIG. 2, and the lever C will be instantly released upon its engagement with the stop nut 46. In said range of adjustments of the stop nut 46, the lower the positioning of said stop nut, the lesser will be the area of the valve port 28 which is opened to the sump chamber 25 and, consequently, the lesser will be the quantity of cream contained in each dash of cream delivered. This feature of quickly dispensing dashes of cream in variable amounts is desirable under certain circumstances, as will be readily appreciated.

In dispensing cream from the dispenser in relatively large unmeasured quantity upon each cycling of the actuating lever C as in supplying cream to a bowl of food, or to a drinking glass, or even to the extent of draining all of the cream from the supply chamber 15 of the container A, the stop nut 46 will be positioned on the valve guide 26 as shown in solid lines in FIG. 1 with the result that when the lever C is raised, the lift valve $b$ will be elevated to the position shown in dotted lines in FIG. 1. In this position of said lift valve $b$ the head thereof is disposed above the inlet port 34 of the valve plate 33 in non-obstructing relationship with respect thereto, as hereinbefore indicated. Thereupon, and so long as the actuating lever C is held up against the stop nut 46, cream contained in the supply chamber 15 of the container A will flow from said chamber 15 and through and out of the lift valve $b$ via the sump chamber 25.

From the foregoing it will be understood that I have provided a simple, durable and relatively inexpensive construction in cream dispensers of relatively few easily cleansed parts, while at the same time providing such a construction wherein the swinging of a self retracting actuating lever in one cycle thereof will in each instance selectively effect the delivery of cream in one or the other of two accurately measured quantities, or in dashes in a range of varying lesser amounts, or in unmeasured amounts, even in amount sufficient to drain the container's supply chamber 15 of its entire contents. These features provide for universal utility of the present cream dispenser, the same being quickly and easily adapted to any of various particular purposes.

Changes in the specific form of the invention, as herein described, may be made within the scope of what is claimed without departing from the spirit of the invention.

Having described the invention, what is claimed as new and desired to be protected by Letters Patent is:

1. Valve mechanism for dispensing cream from a supply chamber of a container, said valve mechanism being movable in a cycle in which cream from the supply chamber is dispensed in an amount of predetermined quantity, said mechanism being adjustable to vary, at will, the quantity of cream in each amount thereof dispensed, said valve mechanism including a sump member providing a sump chamber for the reception of cream from the supply chamber, a tubular guide depending from said sump member and opening into the sump chamber therein, a lift valve movable upwardly from a depressed position and back again, said lift valve including a stem and a head, the stem being slidably received within said tubular guide, said stem being formed with a longitudinal bore open at its lower end for the discharge of cream therefrom and formed with an ingress port in the side thereof leading into said bore, said tubular guide serving to close said ingress port in the valve stem in depressed disposition of the lift valve, a valve plate capping the sump member and having an inlet port leading from the cream supply chamber into said sump chamber, the head of the lift valve being adapted to move from the sump chamber into said inlet port of the said valve plate obstructing the same, at least initially upon the lifting of said valve, the ingress port in the valve stem being adapted to clear the valve guide and open into the sump chamber upon the lifting of the valve sufficiently to elevate its head into valve obstructing relationship with the inlet port of the valve plate, low-limit stop means for arresting the descent of the valve at the depressed disposition thereof wherein its ingress port is closed by said tubular guide, and adjustable high-limit stop means for variably arresting the ascent of the valve, at least initially in its ascent, at dispositions thereof with its head obstructing the inlet port of the valve plate and with a greater or lesser area of the ingress port of the valve stem open to the sump chamber, said head of said lift valve being of greater diameter than the stem thereof and adapted to pass upwardly through the inlet port of the valve plate and therebeyond on the ascent of the lift valve, thereby opening the cream supply chamber to the discharge bore of the valve stem via the sump chamber and an ingress port in said valve stem.

2. Valve mechanism, as defined in claim 1, wherein the adjustable upper-limit stop means includes a stop nut mounted on and adjustably movable along the tubular valve guide, and means connected with the valve and adapted to engage said stop nut for variably arresting the ascent of the valve.

3. Valve mechanism, as defined in claim 2, wherein the stop nut on the valve guide is adjustable therealong to admit of the upward projection of said valve head through and beyond the inlet port of the valve plate to open the cream supply chamber to the discharge bore of the valve via the sump chamber and ingress port in the valve stem.

4. Valve mechanism, as defined in claim 2, wherein an annular shroud encircles the tubular valve guide and the stop nut thereon, said shroud having a set screw threaded therein, and adapted to be screwed against said stop nut to secure it in adjusted position.

5. Valve mechanism, as defined in claim 2, wherein the stop nut is threaded on the valve guide and screwable therealong, and wherein an annular shroud encircles the tubular valve guide and adjustable stop nut, said stop nut having a number of annular demarkations thereon for guiding reference, relative to the lower edge of said shroud, in adjusting the stop nut along said valve guide.

6. Valve mechanism, as defined in claim 2, wherein the adjustable stop nut is screwable along the valve guide, and the means connected with the valve and engageable with the stop nut includes an actuating lever for raising the valve, said lever, medially longitudinally thereof, swingably following a vertical plane coincident with the axis of said stop nut, and an abutment upstanding from said lever in said plane for engagement therein with the stop nut.

7. Valve mechanism, as defined in claim 1, wherein the valve plate is invertible and formed with a protuberance at one face thereof for disposition within the cream supply chamber in the obverse position of said valve plate and for disposition within the sump chamber in the reverse position of said valve plate, thereby in said latter position to reduce the capacity of said sump chamber as compared with its capacity in the obverse position of the valve plate, the protuberance of said valve plate being so formed that when the plate is in its obverse position cream may flow from the supply chamber along the upper face of the valve plate proper into the inlet port in said plate, thereby to provide for the complete drainage of the cream supply chamber.

References Cited in the file of this patent

UNITED STATES PATENTS

| | | |
|---|---|---|
| 2,165,398 | Mayzanobile | July 11, 1939 |
| 2,759,638 | Howard | Aug. 21, 1956 |
| 2,858,052 | Costakos | Oct. 28, 1958 |

FOREIGN PATENTS

| | | |
|---|---|---|
| 337,616 | France | Feb. 25, 1904 |